(12) United States Patent
Reaoch

(10) Patent No.: US 10,629,091 B2
(45) Date of Patent: Apr. 21, 2020

(54) BOW WEIGHT-TRAINING SYSTEMS AND METHODS

(71) Applicant: Jonathan Reaoch, Edina, MN (US)

(72) Inventor: Jonathan Reaoch, Edina, MN (US)

(*) Notice: Subject to any disclaimer, the term of this patent is extended or adjusted under 35 U.S.C. 154(b) by 0 days.

(21) Appl. No.: 16/241,944

(22) Filed: Jan. 7, 2019

(65) Prior Publication Data

US 2019/0213907 A1    Jul. 11, 2019

Related U.S. Application Data

(60) Provisional application No. 62/613,875, filed on Jan. 5, 2018.

(51) Int. Cl.
*G09B 15/06* (2006.01)
*G10D 3/16* (2020.01)

(52) U.S. Cl.
CPC .............. *G09B 15/06* (2013.01); *G10D 3/16* (2013.01)

(58) Field of Classification Search
CPC .................................. G09B 15/06; G10D 3/16
USPC ......................................................... 84/470 R
See application file for complete search history.

(56) References Cited

U.S. PATENT DOCUMENTS

| | | | | |
|---|---|---|---|---|
| 2,820,388 A | * | 1/1958 | Rolland | G10D 3/16 84/282 |
| 3,272,055 A | * | 9/1966 | Henkle | G10D 3/16 84/283 |
| 3,456,544 A | * | 7/1969 | Glasser | G10D 3/16 84/282 |
| 4,015,501 A | * | 4/1977 | Schaller | G10D 3/16 84/282 |
| 4,493,238 A | * | 1/1985 | Ricci | G10D 3/16 84/282 |
| D368,733 S | * | 4/1996 | Expose | 84/282 |
| 6,075,188 A | * | 6/2000 | Wetzlinger | G10D 3/16 84/274 |
| D563,456 S | * | 3/2008 | Plummer | D17/20 |
| 9,959,846 B1 | * | 5/2018 | Landon | G10D 3/16 |
| 2009/0211432 A1 | * | 8/2009 | Casillas | G09B 15/06 84/465 |

(Continued)

FOREIGN PATENT DOCUMENTS

| | | | | |
|---|---|---|---|---|
| CN | 201302806 Y | * | 9/2009 | |
| DE | 3707067 A1 | * | 9/1988 | ......... A63B 21/0624 |
| JP | 2013097266 A | * | 5/2013 | ............. B29C 70/06 |

*Primary Examiner* — David S Warren
*Assistant Examiner* — Christina M Schreiber
(74) *Attorney, Agent, or Firm* — Fredrikson & Byron, P.A.

(57) ABSTRACT

Disclosed herein are musical training devices, systems, and methods, in particular, for bowed string instruments, which alter the balance point of a bow by adding weight at certain locations on the bow to alter the natural balance of the bow. A training system can include a bow and a training device. An illustrative training device can include a housing, a retaining mechanism, and a weight assembly. The housing may be attachable to the bow. The retaining mechanism can be configured to attach the housing to the bow. The weight assembly may be attachable to the housing, the retaining mechanism, or both. The retaining mechanism can include an integral attachment feature or a separate fastener or lockable gate. A method for using a training device can include providing a bow and a training device, attaching the training device to the bow, and playing a bowed string instrument.

20 Claims, 6 Drawing Sheets

(56) References Cited

U.S. PATENT DOCUMENTS

| | | | | |
|---|---|---|---|---|
| 2011/0094365 A1* | 4/2011 | Kimmons | ............... | G09B 15/06 |
| | | | | 84/325 |
| 2013/0111757 A1* | 5/2013 | Yamamoto | ................ | G10D 3/16 |
| | | | | 29/896.22 |
| 2014/0245876 A1* | 9/2014 | Kunstadt | ................... | G10D 3/16 |
| | | | | 84/282 |
| 2019/0213907 A1* | 7/2019 | Reaoch | .................... | G10D 3/16 |

* cited by examiner

--Prior Art--

BOW WEIGHT-TRAINING SYSTEMS AND METHODS

REFERENCE TO RELATED APPLICATIONS

This application claims an invention which was disclosed in provisional application No. 62/613,875, filed Jan. 5, 2018, entitled "Bow Weight-Training System." The benefit under 35 U.S.C. § 119(e) of the United States provisional application is hereby incorporated herein by reference.

TECHNICAL FIELD

This disclosure relates generally to devices, systems, and methods for musical training, particularly by introducing weight to the bow of a stringed instrument.

BACKGROUND

Musical training, even for the most skilled musicians, generally results in or sustains high-level performance on a chosen instrument. Traditional training methods for musicians who play bowed string instruments include reversing which end of the bow is held during play. Bows generally include a tip end and a frog end, which is the end typically gripped by the musician during play. Since the frog end of the bow is generally heavier than the tip end of the bow, holding the bow by its tip end during play disrupts the typical balance of the bow experienced during play. As a result, the musician is required to make real-time adjustments to perform otherwise familiar bow strokes, thereby gaining greater strength and enhanced motor skills. However, such traditional methods of training string-instrument players often result in damaged bows, which require costly repairs.

SUMMARY

Embodiments of the present invention are directed toward musical training devices, in particular for bowed string instruments that alter the balance point of a bow by adding weight at certain locations on the bow, which can alter the natural balance of the bow. An illustrative musical training device can include a housing and a retaining mechanism. Some embodiments of the training mechanism can include a weight assembly, which may be attachable to the housing, the retaining mechanism, or both. Altogether, the musical training device can have a first weight, which may be changed by adding or removing, for example, any number of weight members. Such weight members, can be attachable to each other, attachable to some portion of the training device, or received within the training device, for example, in a reservoir attached to the training device.

Uses of such devices are an improvement over conventional training methods. For example, conventional training methods for bowed string instruments include gripping the bow at the tip end to play the instrument. Such a method inevitably results in undesired contact between a musician's playing hand and the bow hair. This contact results in transfer of body fluids, such as oil, that is harmful to, e.g., the rosin on the bow hair, and may result in having to prematurely replace the bow hair. Holding the bow at the tip end can wear away the varnish of the bow and damage the bow stick. As a result, continued use of such a method can become unnecessarily costly.

In addition, illustrative training devices offer a variety of advantages. Adding weight to a bow using this device alters the weight of a previously-balanced bow causing a musician to make adjustments to play in otherwise-familiar strokes. This increases strength, awareness, and dexterity. Other advantages include that the training device can offer the ability to adjust the amount of weight desired for a particular training and is durable enough to be used over a period of time. During use, the training device can be easily attached to or removed from a bow. The device also minimizes the risk of a player's hand coming into contact with the bow hair. As a result, musicians who train using this device can receive advanced training which provides significant improvement over short periods of time while avoiding unnecessary, costly repairs.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and provides some practical illustrations and examples. Those skilled in the art will recognize that many of the noted examples have a variety of suitable alternatives. A number of various exemplary musical training systems, devices, and techniques are disclosed herein using the description provided as follows in addition to the accompanying drawings. Each of the systems, devices, and techniques disclosed herein can be employed independently or in combination with one or more (e.g., all) of the other systems, devices, and techniques disclosed herein.

Figure 1A:
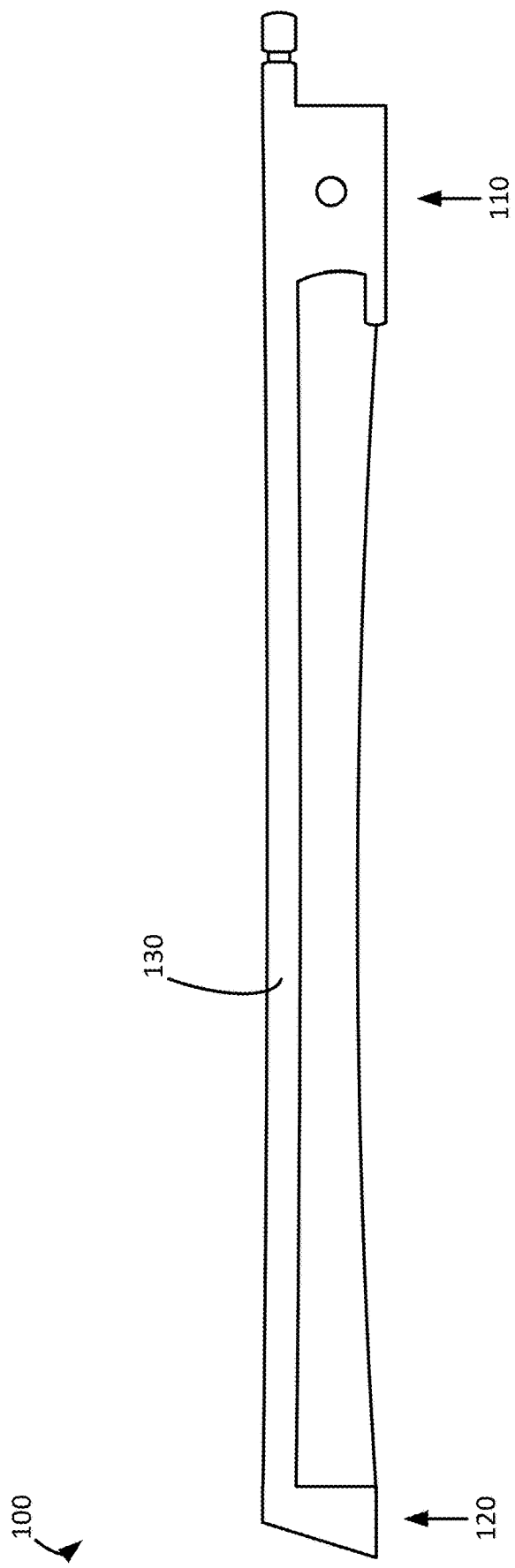
FIG. 1A is a side elevational view of a conventional bow for a bowed string instrument.
Figure 1B:
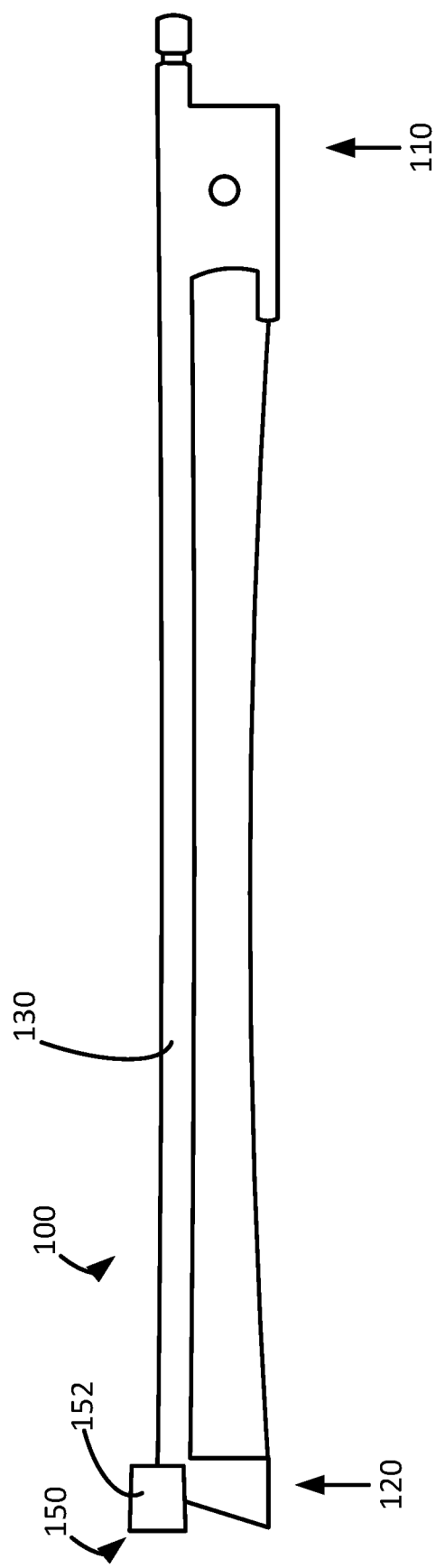
FIG. 1B is a side elevational view of the bow according to FIG. 1A with a training device attached at a tip end of the bow.

A musical training system can include a bow 100 and a training device 150 as shown in FIGS. 1A and 1B. The bow 100, as shown in FIG. 1A, can be similar to a conventional bow 100 (e.g., a violin bow, a viola bow, a cello bow, a bass bow, etc.). The bow 100 can have a frog end 110, a tip end 120, and a bow stick 130. The bow stick 130 can extend between the frog end 110 and the tip end 120. Depending on the weight and size of the bow 100, a balance point at which the bow 100 balances, similar to the center of gravity, can be found at some location between the frog end 110 of the bow 100 and the tip end 120 of the bow 100. In many instances, as can be seen in FIG. 1B, the weight training device 150 is configured to attach to the bow 100, e.g., at a location that is offset from the balance point.

With continued reference to FIG. 1B, the training device 150 can have a first weight sufficient to alter the balance point of the bow 100. The first weight can be about one ounce. In some instances, the training device 150 itself is weighted. For instance, the training device 150 may include a housing 152 and a retaining mechanism. The first weight can be provided by the housing 152, the retaining mechanism, or a combination thereof. In some embodiments the device includes a weight assembly. In such instances, the first weight can be provided by the weight assembly.

Because of the weight of the training device 150, attaching the training device 150 to the bow 100 can alter the properties and behavior of the bow 100. During operation, the training device 150 can be attached at any position on the bow 100. For example, the device may be attached at the tip end 120, at the frog end 110, or anywhere on the bow stick 130 of the bow 100. In such examples, the balance point may be altered from a state in which the device is not attached to the bow 100, thereby changing the balance of the bow 100. Different components of the device may be configured to provide such an attachment.

In a number of ways, the housing 152 can be configured to attach to the bow 100 via the retaining mechanism. The housing 152 may surround at least a portion of the bow 100. An illustrative embodiment of the training device 150 may have the housing 152 attached to the frog end 110 of the bow 100. Once attached, the housing 152 may be secured to the bow 100 via a retaining mechanism that is configured to attach and/or secure the housing 152 to the bow 100.

Figure 2A:
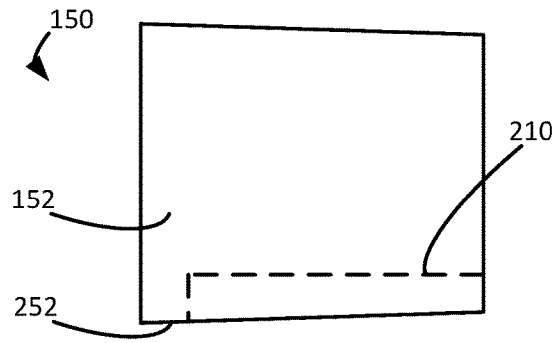
FIG. 2A is a side elevational view of a training device having a slot retaining mechanism.
Figure 2B:
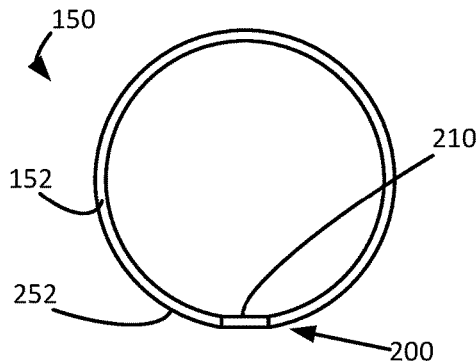
FIG. 2B is a front elevational view of a training device having a slot retaining mechanism.
Figure 2C:
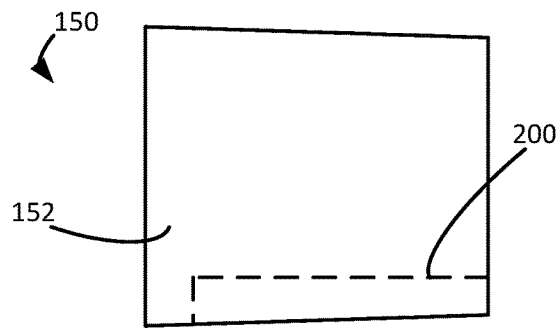
FIG. 2C is a side elevational view of a training device having a fastener retaining mechanism.
Figure 2D:
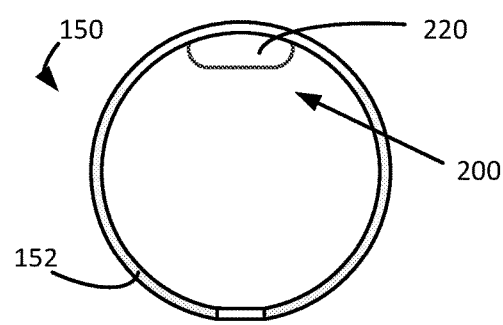
FIG. 2D is a front elevational view of a training device having a fastener retaining mechanism.

As shown in FIGS. 2A-2F, the arrangement of the retaining mechanism 200 can vary between embodiments. On one hand, the retaining mechanism 200 can be included in the housing 152. The retaining mechanism 200 can include an integral attachment feature of the housing 152. For example, in such instances, as shown in FIGS. 2A and 2B, the retaining mechanism 200 can be a slot 210 extending at least partially through the length of a wall 252 of the housing 152, a snap-fit feature of the housing 152, a clip of the housing 152, etc. On the other hand, the retaining mechanism can be separate components from the housing 152. For instance, the housing 152 can attach to the bow via one or more fasteners 220 (e.g., screws, hook-and-loop fasteners, clamps, magnets, etc.) as shown in FIGS. 2C and 2D. Illustrative embodiments of the retaining mechanism 200 can include a lockable gate. In such instances the lockable gate can be hinged at one end and lockable at another end, for example, via a locking mechanism such as a clip.

Figure 2E:
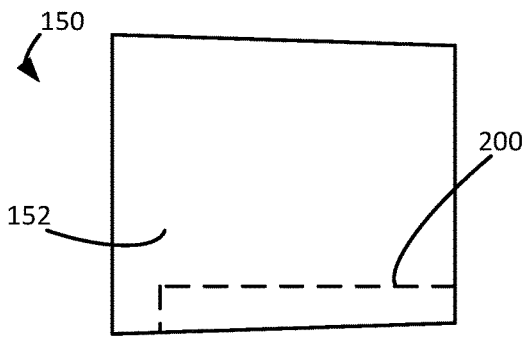
FIG. 2E is a side elevational view of a training device having a lockable gate retaining mechanism.
Figure 2F:
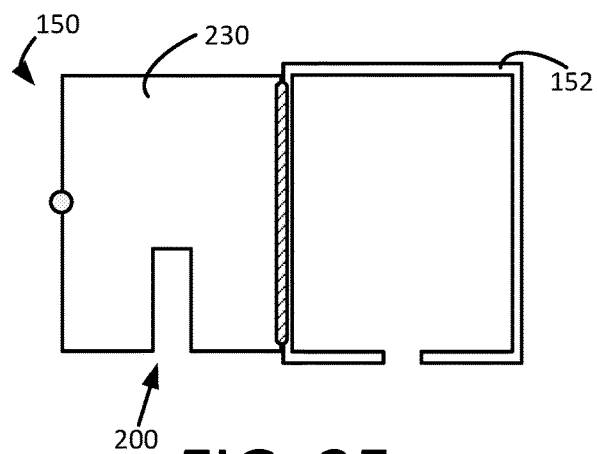
FIG. 2F is a front elevational view of a training device having a lockable gate retaining mechanism.

The lockable gate 230, as shown in FIGS. 2E and 2F, can be configured to enclose at least a portion of the bow within the housing 152. The lockable gate 230 can be slid over a portion of the bow and attach to the housing 152 so as to lock the lockable gate 230. For instance, the lockable gate 230 can span an opening in the housing 152 and be attachable to the housing 152 at opposing ends so as to surround a portion of the bow with the lockable gate 220. In other instances, the lockable gate 230 can be hingeably connected to the housing 152.

Figure 3B:
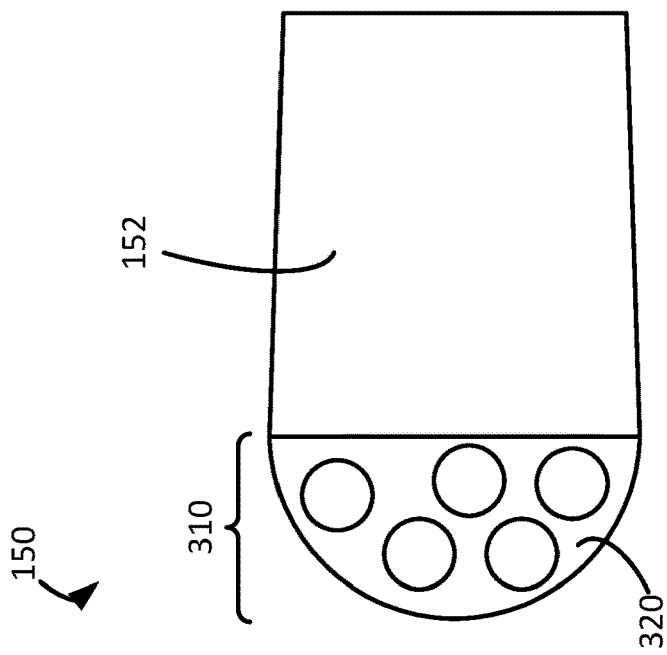
FIG. 3B is a side elevational view of a training device having a weight assembly of individually weight members in a reservoir.
Figure 3A:
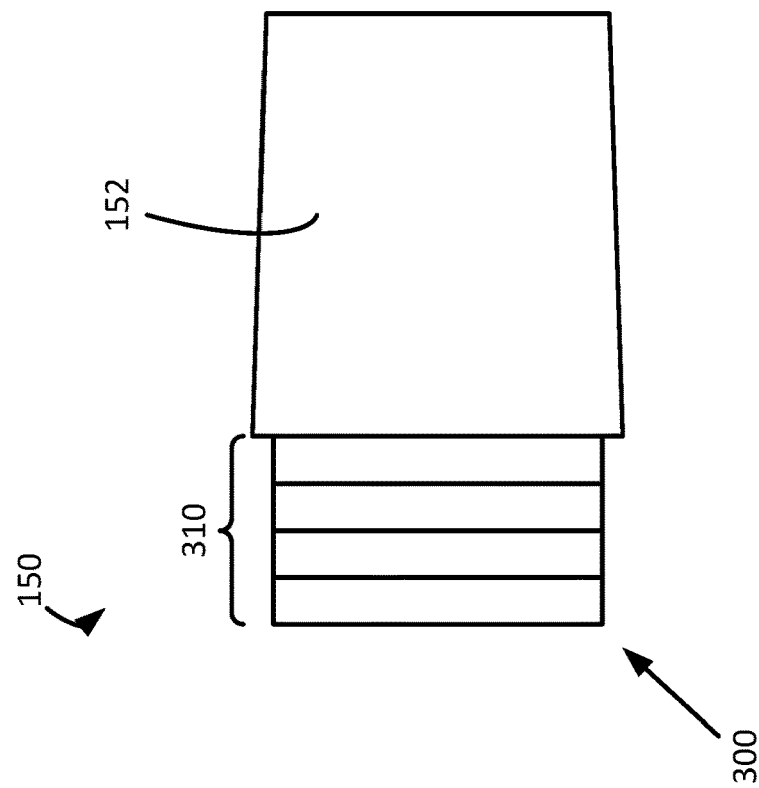
FIG. 3A is a side elevational view of a training device having a weight assembly of individually attachable weight members.

In some embodiments, the weight assembly 300 shown in FIGS. 3A and 3B, can provide or add to the first weight of the training device 150. In so doing, the weight assembly 300 can attach to different portions of the training device 150. For instance, the weight assembly 300 can be attachable to the housing 152, to the retaining mechanism 200, or both. The weight assembly 300 can have the same or different weight from the housing (e.g., a second weight). Some embodiments of the training device 150 may have the weight assembly 300 include more than one component.

The weight assembly 300 can include a plurality of individual weight numbers as shown in FIG. 3A. At least one weight member 310 in the plurality of individual weight members 310 can be attachable to the housing 152. Each weight member 310 in the plurality of individual weight members 310 can be attachable to the other. For example, the individual weight members 310 may be magnets or other individual members connectable by, e.g., a fastener such as tape, hook-and-loop fasteners, etc.

The weight assembly 300 can be configured to receive a plurality of weight members as shown in FIG. 3B. In some embodiments, the weight assembly 300 may include a reservoir 320 for receiving one or more weight members 310, e.g., in a compact form such as if a ball. The weight assembly 300, in some instances, includes a channel for supporting each weight member 310. In such instances, the channel can be adjustable to accommodate a variety of sizes and shapes created by the weight members.

Figure 4:
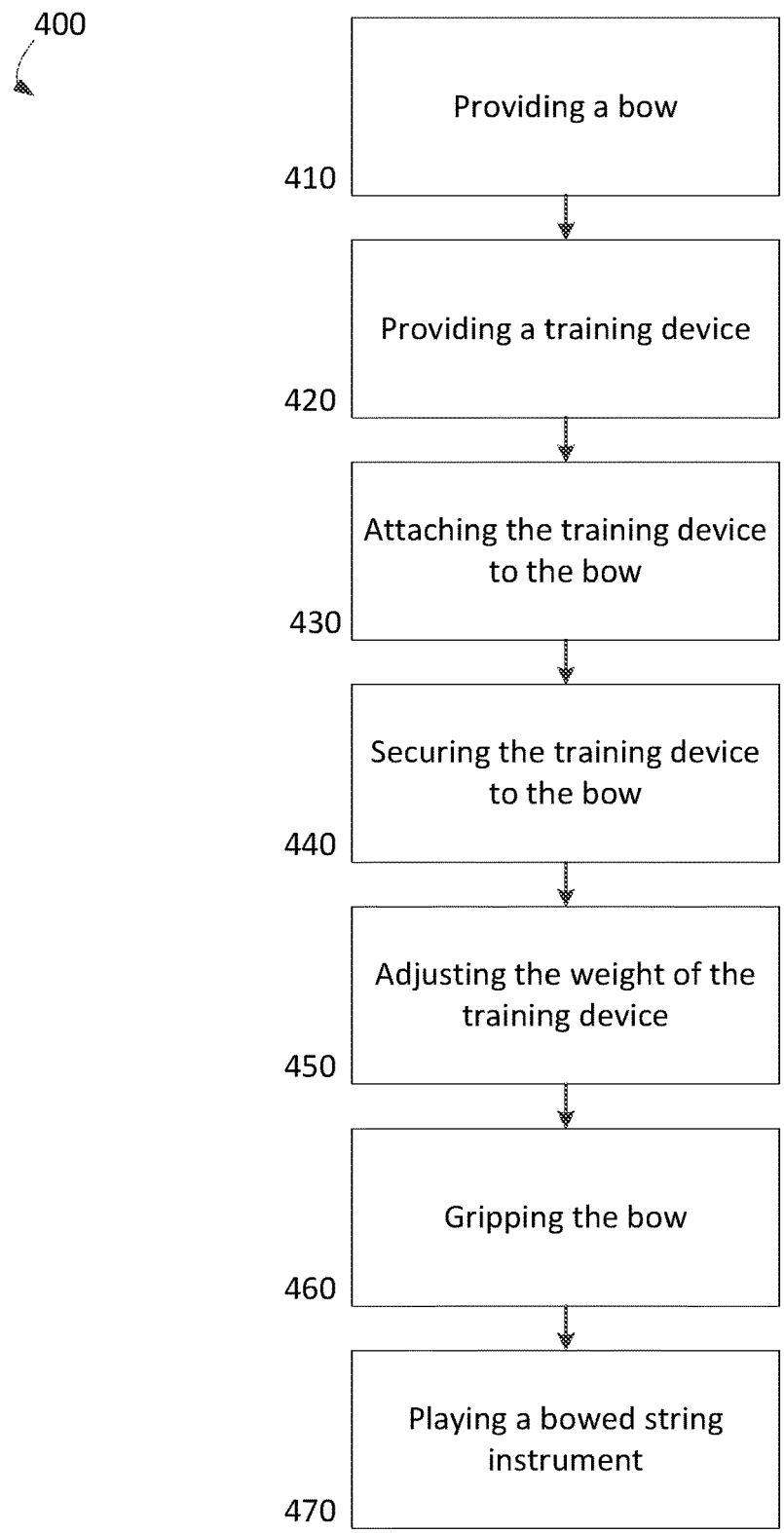
FIG. 4 is a flow diagram for a method of using a training device.

As shown in FIG. 4, a method 400 of training for playing a bowed string instrument is also disclosed. The method 400 can include providing the bow 410 similar to those described elsewhere herein. The method 400 can include providing a training device 420 similar to those disclosed elsewhere herein. The method 400 can include attaching the training device to the bow 430. The method 400 can include gripping the bow 460. The method 400 can include playing a bowed string instrument 470, e.g., for a first series using the bow.

In some embodiments, attaching the training device 430 to the bow includes attaching the training device to either the frog end or the tip end of the bow. An illustrative embodiment of the method 400 may have the training device attached to the frog end of the bow. In other instances of the method 400, the training device may be attached anywhere along the length of the bow stick. Perhaps, some illustrative methods include securing the training device to the bow 440, e.g., via the retaining mechanism.

In some embodiments, the method 400 includes adjusting the weight of the training device 450. Such adjustments can include selecting one or more weight members or different housings depending on the desired difficulty of training. In some embodiments, the method 400 includes connecting the one or more weight members to the housing. For instance, to increase the difficulty of training, more weight can be added to the training device. On the contrary, to decrease the difficulty of training, less weight can be added to the training device or the training device can be removed altogether.

The bow can be gripped in any number of places. In some embodiments gripping the bow 460 includes grasping the end of the bow opposite of the training device. For a more conventional play, the bow can be grasped at the frog end of the bow and a training device can be placed at the tip end of the bow. To add more weight to an end of the bow, perhaps the training device is placed at the frog end of the bow and played by grasping the tip end of the bow.

To provide variability in the training, the training device can be altered to change the weight or removed before playing the bowed string instrument 470. For instance the instruments can be played over a number of different series in a span of time. In a first series, the training device may be attached to the bow. In some embodiments, the method 400 can include removing the training device from the bow, for instance before playing a second series. In some embodiments, the method 400 can include playing the bowed string instrument for a second series using the bow. Certain embodiments of the method 400 can continue in this way over a number of different series of play with varying arrangements of the training device.

Figure 5A:
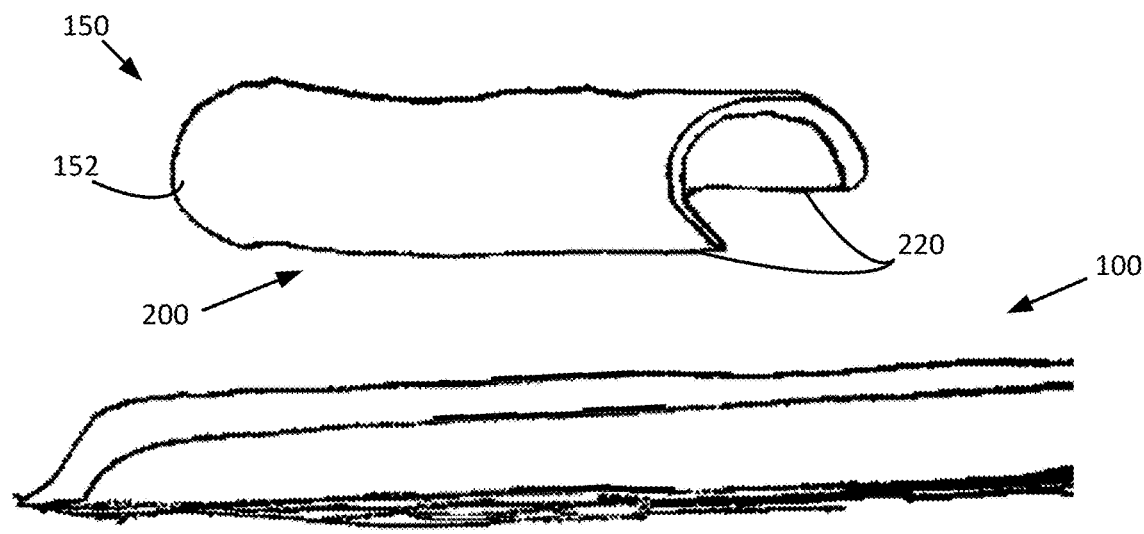
FIG. 5A is a perspective view of an alternative embodiment of a training device having a flexible housing and a fastener retaining mechanism.
Figure 5B:
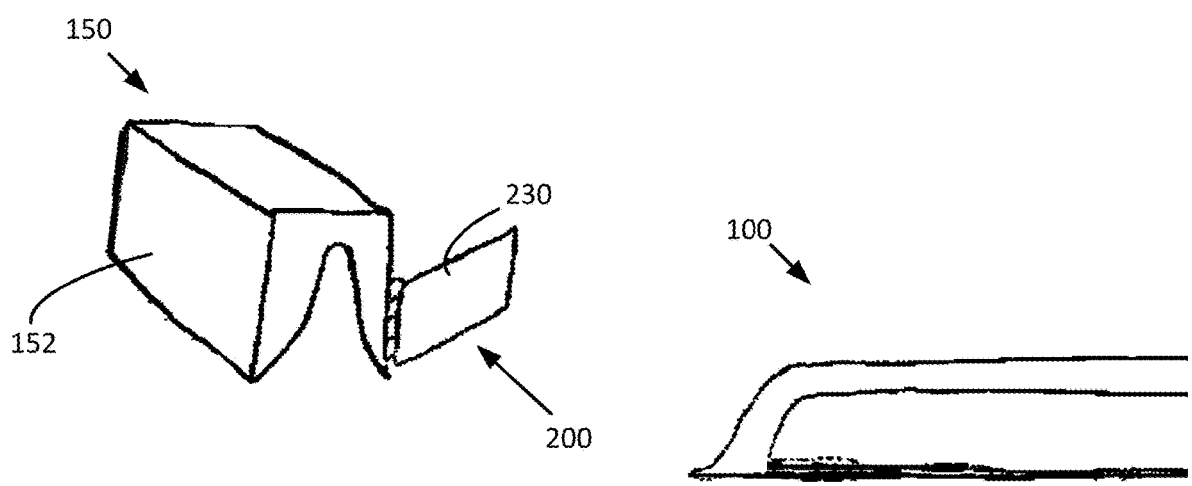
FIG. 5B is a perspective view of an alternative embodiment of a training device having a lockable gate retaining mechanism.

Embodiments of the training device 150 may vary, examples of which can be seen in FIGS. 5A and 5B. Alternative materials for the training device 150 include flexible materials (e.g., plastic), rigid materials (e.g., plastic, wood, or metal), or any other suitable material and combinations thereof. For example, the embodiment shown in FIG. 5A may comprise a rigid housing 152 and include a portion of the housing 152 adapted to receive a portion of the bow 100 and a retaining mechanism 200 that is a lockable gate 220. As another example, the embodiments shown in FIG. 5B may include a flexible housing 152 configured to wrap around the bow 100 and secure one portion of the housing 152 to another via a retaining mechanism 200 that is a fastener (e.g., a hook-and-loop fastener or a clip). The housing 152 in such embodiments may wrap around the bow 100 to form a tight fit with the bow 100, e.g., to prevent movement of the training device 150 relative to the bow.

Although mentioned in connection with bowed string instruments, one skilled in the art can appreciate that such a training device can be adapted to be or readily employed for use on a number of different musical instruments or similar devices. For instance, such a training device can be used on percussion mallets such as drum sticks or timpani mallets. The training device may be used on other balanced devices intended to induce vibrations in musical instruments or to be moved across instruments, e.g., at the strings.

Various examples have been described with reference to certain disclosed embodiments. The embodiments are presented for purposes of illustration and not limitation. One skilled in the art will appreciate that various changes, adaptations, and modifications can be made without departing from the scope of the invention.

The invention claimed is:

1. A musical training device comprising:
   a housing attachable to a bow of a bowed string instrument, the housing having a wall defining a first opening with which to receive a portion of the bow, and
   a retaining mechanism being configured to attach the housing to the bow and including a slot and a lockable gate that is connectible to the housing, the slot being configured to receive a portion of the bow and extending at least partially through a length of the wall of the housing, the lockable gate having a first end, a second end opposite the first end, and a second opening with which to receive a portion of the bow, the lockable gate being configured to move between an unlocked position in which the lockable gate is disconnected from the housing and a locked position in which the lockable gate is connected to the housing via at least one of the first and second ends so as to cover the first opening of the housing thereby attaching the housing to the bow;
   wherein the musical training device has a first weight that alters a balance of the bow.

2. The musical training device of claim 1 wherein the slot extends through an entirety of the length of the wall of the housing.

3. The musical training device of claim 1 wherein the first weight is provided by the housing.

4. The musical training device of claim 1 further comprising a weight assembly attachable to the housing or the retaining mechanism.

5. The musical training device of claim 4 wherein the first weight is provided by the weight assembly.

6. The musical training device of claim 5 wherein the weight assembly comprises a plurality of individual weight members including first and second weight members, the first weight member providing the first weight and the second weight member providing a second weight separate from the first weight, and wherein at least one weight member in the plurality of individual weight members is attachable to the housing.

7. The musical training device of claim 6 wherein each weight member in the plurality of individual weight members is attachable to the other.

8. The musical training device of claim 1 wherein the lockable gate is a lockable swing gate hingably connected to the housing at the first end of the lockable gate, and wherein the locked position of the lockable swing gate includes connecting the second end of the lockable gate to the housing.

9. The musical training device of claim 1 wherein the retaining mechanism is configured to attach the housing at a tip end of the bow so as to protrude from the bow in a directional parallel to a length of a bow stick of the bow.

10. A musical training system comprising:
    a bow having a frog end, a tip end, and a bow stick extending between the frog end and the tip end, and
    a weighted training device comprising:
    a housing configured to attach to the bow, the housing having a wall defining a first opening with which to receive a portion of the bow;
    a retaining mechanism being configured to attach the housing to the bow and including a slot and a lockable gate that is connectible to the housing, the slot being configured to receive a portion of the bow and extending at least partially through a length of the wall of the housing, the lockable gate having a first end, a second end opposite the first end, and a second opening with which to receive a portion of the bow, the lockable gate being configured to move between an unlocked position in which the lockable gate is disconnected from the housing and a locked position in which the lockable gate is connected to the housing via at least one of the first and second ends so as to cover the first opening of the housing thereby attaching the housing to the bow; and
    a weight assembly.

11. The musical training system of claim 10 wherein the weighted training device is attached to the tip end of the bow.

12. The musical training system of claim 10 wherein the weighted training device is attached to the frog end of the bow.

13. The musical training system of claim 10 wherein the weighted training device is attached to the bow stick of the bow.

14. The musical training system of claim 10 wherein the lockable gate is a lockable swing gate hingably connected to the housing at the first end of the lockable gate, and wherein the locked position of the lockable swing gate includes connecting the second end of the lockable gate to the housing.

15. The musical training system of claim 10 wherein the weight assembly is configured to receive a plurality of weight members.

16. The musical training system of claim 15 wherein each weight member in the plurality of weight members is attachable to the other.

17. A method of training for playing a bowed string instrument, the method comprising:
   selecting a bow having a frog end and a tip end;
   selecting a training device comprising:
      a housing attachable to the bow, the housing having a wall defining a first opening with which to receive a portion of the bow,
      a retaining mechanism being configured to attach the housing to the bow and including a slot and a lockable gate that is connectible to the housing, the slot being configured to receive a portion of the bow and extending at least partially through a length of the wall of the housing, the lockable gate having a first end, a second end opposite the first end, and a second opening with which to receive a portion of the bow, the lockable gate being configured to move between an unlocked position in which the lockable gate is disconnected from the housing and a locked position in which the lockable gate is connected to the housing via at least one of the first and second ends so as to cover the first opening of the housing thereby attaching the housing to the bow, and
      a weight assembly having a first weight that alters a balance of the bow;
   attaching the training device to the bow,
   gripping the bow, and
   playing a bowed stringed instrument for a first series using the bow.

18. The method of claim 17 wherein attaching the training device to the bow comprises attaching the training device to either the frog end or the tip end of the bow, and wherein gripping the bow comprises grasping the bow at the end opposite of the training device.

19. The method of claim 17 wherein the weight assembly is attachable to the housing and comprises one or more weight members, and wherein the method further comprises: selecting one or more weight members depending on a desired difficulty of training and connecting the one or more weight members to the housing.

20. The method of claim 17 further comprising:
   removing the training device from the bow and
   playing the bowed stringed instrument for a second series using the bow.

* * * * *